July 11, 1944.   J. G. DEMETROPOULOS   2,353,128
CABLE SLICER
Filed Jan. 26, 1944   2 Sheets-Sheet 1
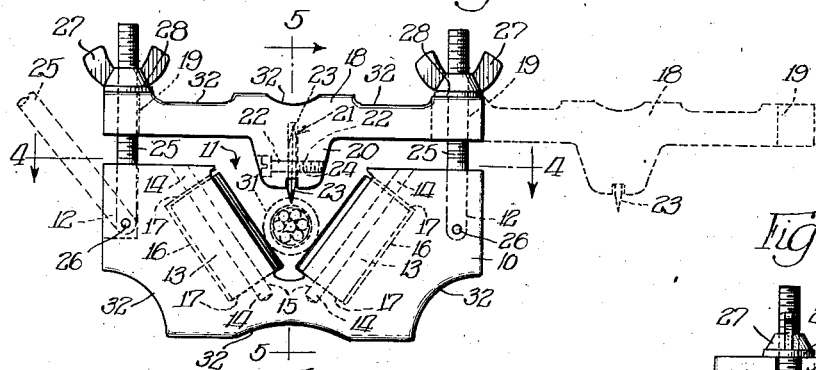
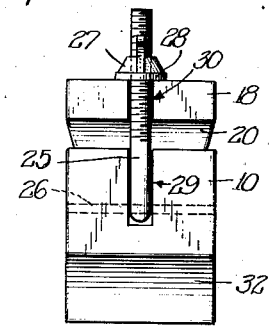
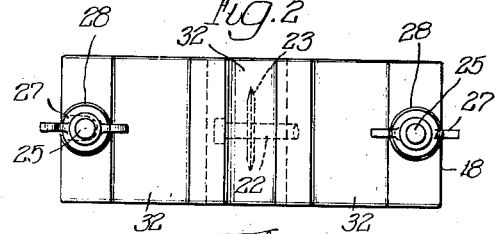
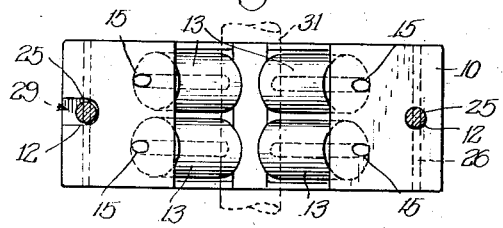
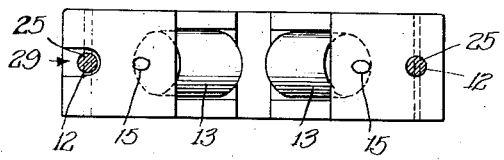
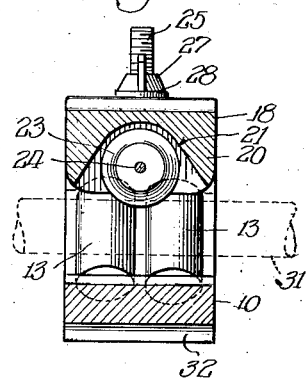
INVENTOR.
John G. Demetropoulos,

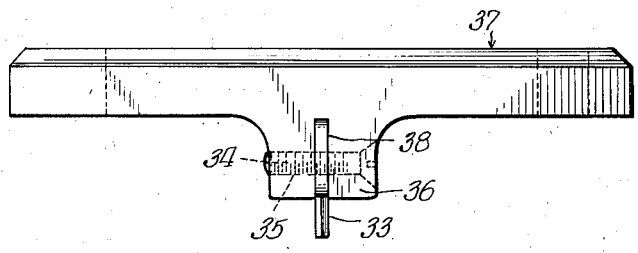
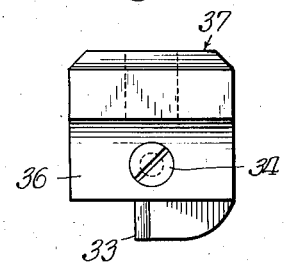
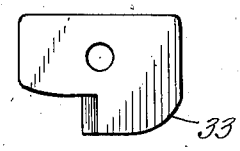

Patented July 11, 1944

2,353,128

UNITED STATES PATENT OFFICE 2,353,128

CABLE SLICER

John G. Demetropoulos, Milwaukee, Wis.

Application January 26, 1944, Serial No. 519,770

8 Claims. (Cl. 30—91)

This invention relates in general to a cable slicing device, and more particularly to a device for slitting the protecting sheath of an electrical conductor cable comprising multiple insulated conductors in order that the ends of the conductors may be stripped for splicing or other purposes.

An object of the invention is to provide compact, safe, simple and efficient means for slitting the sheath of such a cable, which is usually a metallic sheath but may be of other material, conveniently and quickly by hand, the device being so formed and arranged that it can be easily clamped about a cable and gripped with one hand and quickly moved to and fro longitudinally of the cable to accomplish the slicing or slitting operation.

Other objects of the invention include the provision of novel means for applying the device to a cable and removing it therefrom. Additional objects, advantages and capabilities inherent in this invention will become readily apparent from the description thereof which follows.

This invention further resides in the combination, construction and arrangement of parts illustrated in the accompanying drawings, and while there is shown therein preferred embodiments of the invention, it is to be understood that the same are susceptible of modification and change without departing from the spirit of the invention.

This application is a continuation in part of application Serial No. 498,470, filed August 13, 1943.

The accompanying drawings illustrate a selected embodiment of the invention, and the views therein are as follows:

Fig. 1 is a front elevational view of the invention, showing in dotted lines portions of the device in operative position;

Fig. 2 is a plan view of the device shown in Fig. 1;

Fig. 3 is an end elevation of the device looking to the right in Fig. 1;

Fig. 4 is a horizontal sectional view as along the line 4—4 of Fig. 1 of an alternative form of the invention;

Fig. 5 is a vertical sectional view as along the line 5—5 of Fig. 1 of the device shown in Fig. 4;

Fig. 6 is a plan view partially in section of the lower portion of the device shown in Fig. 1;

Fig. 7 is a front elevation of an alternative form of a portion of the device shown in Fig. 1;

Fig. 8 is a side elevation of the portion of the device shown in Fig. 7;

Fig. 9 is a detail view of a portion of the device shown in Fig. 7.

The particular device herein disclosed for the purpose of illustrating the invention comprises a body member 10, which may be of any suitable material, but preferably metallic. This body member is generally rectangular in form but has a central cut away portion 11 and spaced vertically extending openings 12. The cut away portion 11 is arranged to receive opposed, angularly disposed rollers 13 having an axially extending opening therethrough adapted to receive a pin 14 in freely rotatable and slidable relation. Openings 15 are provided in opposed walls 17 of the cut away portion 11 for snugly receiving the end portions of pins 14. The rollers 13 are arranged in spaced relation with respect to the walls 16 and 17 of the cut away portion 11 so as to be freely slidable and rotatable on their respective pins 14.

A clamp member 18 having spaced vertically extending openings 19 and a central depending portion 20 is arranged to fit upon the upper portion of the body member 10. The openings 19 are arranged to register with the openings 12, and the depending portion 20 is arranged medially with respect to the cut away portion 11 and opposed surfaces of the rollers 13 when the clamp member 18 is arranged in operative position with respect to the body member 10.

The depending portion 20 of the clamp member 18 has a central, transversely extending cut away portion 21 and longitudinally extending central openings 22 having a common axis extending at right angles to said cut away portion at each side thereof. The cut away portion 21 is adapted to receive a cutting or slicing member 23 which is rotatably mounted on a pin 24, the opposed ends of which are adapted to be received in the openings 22 respectively, and it may be threaded or otherwise snugly fitted therein.

The clamping member 18 is adapted to be clamped against the body member 10 by means of threaded members 25, having one end adapted to be secured in an opening 12 in the body member 10, as by means of a cross-pin 26 extending through a transverse opening in the end portion of the member 25. The members 25 are received in corresponding openings 19 in the member 18, respectively. The clamping action is accomplished by means of wing nuts 27 threaded on the outer ends of the members 25 which project beyond the member 18. Spring washers 28 may be provided intermediate the nuts 27 and the adjacent portions of the clamping member 18.

In order that the clamping member 18 may be readily applied to and removed from operative position in relation to the body member 10, cut away portions 29 and 30 are provided in one wall of the body member 10 and the clamping member 18 adjacent an opening 12 and the corresponding opening 19 in the clamping member 18, respectively. The corresponding threaded member 25 is adapted to pivot about its pin 26 and swing outwardly through the cut away portions 29, 30, upon loosening or removal of the wing nut 27 to permit turning of the clamping member 18 about the other threaded member 25 to a removed position, as indicated in dotted lines in Fig. 1.

Generally the parts are arranged so that a cable 31 to be sliced or slit may be positioned between opposed surfaces of the rollers 13, and the cutting member 23 brought into cutting relation with respect thereto upon adjustment of the clamping member 18 in operative position by turning the wing nuts 27, as indicated in Fig. 1.

For convenience in gripping the device, finger recesses 32 are provided in the outer surfaces of the members 10 and 18, as shown in Fig. 1.

The operation of the device may be described as follows:

The parts being in inoperative position, that is, the threaded member 25 shown in dotted lines at the left of Fig. 1 and the clamping member 18 shown in dotted lines at the right of Fig. 1 being swung outwardly, a cable 31, the sheath of which is to be cut, is placed in position between opposed surfaces of the rolls 13 as shown in dotted lines in Fig. 1. The clamping member 18 is then turned about the threaded member 25 until the opening 19 at its right end is brought into registry with its corresponding opening 12 of the body member 10. The outwardly swung threaded member 25 is then brought into vertical, operative position through the cut away portions 29, 30. The wing nuts 27 and washers 28 are then adjusted on the threaded members 25 to bring the clamping member 18 into clamping engagement and cause the cutter 23 to penetrate the sheath of the cable 31. The device may then be gripped by one hand and moved to and fro along the cable to slit the sheath of the cable as desired.

In a modified form of the device multiple rollers may be employed in the manner shown in Fig. 4, in which two rollers are arranged side by side on each side of the cut away portion 11 of the body member 10, the construction being identical with that shown in Fig. 1, in all respects except the provisioning of pins 14 and openings 15 for the multiple rollers 13. It will be readily understood, of course, that any desired number of rollers may be employed for this purpose within practical limitations of size.

In another modified form of the device a fixed cutting or slicing member 33 may be employed in the manner shown in Figs. 7, 8 and 9. In this form of the device the cutting or slicing member 33 is fixedly mounted on a pin or screw 34, the opposed ends of which are adapted to be received in openings 35, respectively, provided in the depending portion 36 of the clamp member 37. The clamp member 37 is generally similar to the clamp member 18, except that the depending portion 36 is somewhat shorter in length and the central, transversely extending cut away portion 38 is narrower than the cut away portion 21. The openings 35 are similar to the openings 22. The cutting or slicing member 33 may be in the form shown in Fig. 9 and is arranged to be snugly received in the cut away portion 38 where it is fixedly secured by the pin or screw 34.

Changes may be made in the form, construction and arrangement of the parts without departing from the spirit of the invention, and the right is hereby reserved to make all such changes as fairly fall within the scope of the following claims.

The invention is hereby claimed as follows:

1. A cable slicer comprising a body member, angularly disposed rollers mounted on said body member in spaced relation with each other so that a cable to be operated on may be received therebetween and in rolling engagement therewith, a clamping member, means for pivotally mounting the clamping member with respect to the body member, a cutting member mounted on said clamping member, and means for adjustably connecting said clamping member with said body member to bring said cutting member into desired spaced relation with said rollers and said cable, whereby the slicer may be manually moved along the cable to cut said cable longitudinally thereof.

2. A device for cutting the sheath of a cable comprising a body member, a plurality of angularly disposed rollers mounted on said body member in spaced relation with each other, said rollers being arranged to receive therebetween a cable whose sheath is to be cut, a clamping member adapted to be brought into clamping relation with said cable and said rollers, a cutting member rotatably mounted on said clamping member, and means for adjustably connecting said clamping member with said body member to bring said cutting member into cutting relation with said cable, said means comprising threaded members mounted in spaced openings in said body member, said body member having a cut away portion communicating with one of said openings and the corresponding threaded member being pivotally mounted adjacent one of its ends in said opening whereby said threaded member may be swung outwardly through said cut away portion, said device being manually operable to and fro along said cable to slit its sheath longitudinally thereof.

3. A device for cutting the sheath of a cable comprising a body member, a pair of angularly disposed rollers mounted on said body member in spaced relation with each other, said rollers being arranged to receive therebetween a cable whose sheath is to be cut, a clamping member adapted to be brought into clamping relation with said cable and said rollers, a cutting member rotatably mounted on said clamping member, and means for adjustably connecting said clamping member with said body member to bring said cutting member into cutting relation with said cable, said means comprising a pair of threaded members, each of said threaded members being secured adjacent one of its ends to said body member, and having its opposite end portions extending through spaced openings provided in said clamping member, whereby the device may be manually moved to and fro along said cable to slit the sheath of said cable longitudinally thereof.

4. A tool for cutting the sheath of a cable comprising a body member having a central cut away portion, spaced openings in one face of said body member, a threaded member mounted adjacent one of its ends in each of said openings, a pair of angularly disposed rollers mounted on said body member within said cut away portion and in spaced relation with each other, said rollers being arranged to receive therebetween a cable whose sheath is to be cut, a clamping member adapted to be brought into clamping relation with said cable and said rollers, said clamping member having spaced openings arranged to register respectively with the openings in the body member when said clamping member is brought into the aforesaid clamping relation and adapted to receive said threaded members, said body member and said clamping member, respectively, having a cut away portion adjacent one of said openings and in registry therewith and the corresponding threaded member being pivoted adjacent one of its ends to said body member, whereby said threaded member may be swung outwardly, a cutting member rotatably mounted on said clamping member, and means adjustably connected with said threaded members for securing said clamping member in clamping relation with said cable and rollers, whereby said cutting member may be maintained in cutting relation with the sheath of said cable during manual operation of the device along the cable.

5. A tool for cutting the sheath of a cable comprising a body member having a central cut away portion, spaced openings in one face of said body member, a threaded member mounted adjacent one of its ends in each of said openings, a pair of angularly disposed rollers mounted on said body member within said cut away portion and in spaced relation with each other, said rollers being arranged to receive therebetween a cable whose sheath is to be cut, a clamping member adapted to be brought into clamping relation with said cable and said rollers, said clamping member having spaced openings arranged to register respectively with the openings in the body member when said clamping member is brought into the aforesaid clamping relation and adapted to receive said threaded members, said body member and said clamping member, respectively, having a cut away portion adjacent one of said openings and in registry therewith and the corresponding threaded member being pivoted adjacent one of its ends to said body member, whereby said threaded member may be swung outwardly, a cutting member rotatably mounted on said clamping member, said body member and said clamping member having spaced finger recesses in their outer surfaces, and means adjustably connected with said threaded members for securing said clamping member in clamping relation with said cable and rollers, whereby said cutting member may be maintained in cutting relation with the sheath of said cable during manual operation of the device along the cable.

6. A tool for cutting the metallic sheath of an electrical conductor cable having multiple conductors to enable the ends of the conductors to be spliced comprising a body member having a central cut away portion, spaced openings in one face of said body member, a threaded member mounted adjacent one of its ends in each of said openings, a pair of angularly disposed rollers mounted on said body member within said cut away portion and in spaced relation with each other, said rollers being arranged to receive therebetween a cable whose sheath is to be cut, a clamping member adapted to be brought into clamping relation with said cable and said rollers, said clamping member having spaced openings arranged to register respectively with the openings in the body member when said clamping member is brought into the aforesaid clamping relation and adapted to receive said threaded members, said body member and said clamping member, respectively, having a cut away portion adjacent one of said openings and in registry therewith and the corresponding threaded member being pivoted adjacent one of its ends to said body member, whereby said threaded member may be disconnected from said clamping member and said clamping member may be swung outwardly about the other of said threaded members as a pivot, a cutting member rotatably mounted on said clamping member, and means adjustably connected with said threaded members for securing said clamping member in clamping relation with said cable and rollers, whereby said cutting member may be maintained in cutting relation with the sheath of said cable during manual operation of the device along the cable.

7. A device for cutting the sheath of a cable comprising a body member, a plurality of angularly disposed rollers mounted on said body member in spaced relation with each other, said rollers being arranged to receive therebetween a cable whose sheath is to be cut, a clamping member adapted to be brought into clamping relation with said cable and said rollers, a cutting member fixedly mounted on said clamping member, and means for adjustably connecting said clamping member with said body member to bring said cutting member into cutting relation with said cable, said means comprising threaded members mounted in spaced openings in said body member, said body member having a cut away portion communicating with one of said openings and the corresponding threaded member being pivotally mounted adjacent one of its ends in said opening whereby said threaded member may be swung outwardly through said cut away portion, said cutting member having a generally vertical cutting edge disposed at right angles to said clamping member, said device being manually operable to and fro along said cable to slit its sheath longitudinally thereof.

8. A device for cutting the sheath of a cable comprising a body member, a pair of angularly disposed rollers mounted on said body member in spaced relation with each other, said rollers being arranged to receive therebetween a cable whose sheath is to be cut, a clamping member adapted to be brought into clamping relation with said cable and said rollers, a cutting member fixedly mounted on said clamping member, and means for adjustably connecting said clamping member with said body member to bring said cutting member into cutting relation with said cable, said means comprising a pair of threaded members, each of said threaded members being secured adjacent one of its ends to said body member, and having its opposite end portions extending through spaced openings provided in said clamping member, and said cutting member having a recessed, generally vertical cutting edge disposed at right angles to said clamping member, whereby the device may be manually moved to and fro along said cable to slit the sheath of said cable longitudinally thereof.

JOHN G. DEMETROPOULOS.